US008566599B2

(12) United States Patent
Bhangi (10) Patent No.: US 8,566,599 B2
(45) Date of Patent: Oct. 22, 2013

(54) SYSTEM AND METHOD FOR CONTROLLING ACCESS TO A PORTABLE DEVICE

(75) Inventor: Ashwini A. Bhangi, Panaji (IN)

(73) Assignee: Kyocera Corporation, Kyoto (JP)

( * ) Notice: Subject to any disclaimer, the term of this patent is extended or adjusted under 35 U.S.C. 154(b) by 1504 days.

(21) Appl. No.: 11/608,205

(22) Filed: Dec. 7, 2006

(65) Prior Publication Data
US 2010/0275032 A1   Oct. 28, 2010

(51) Int. Cl.
*H04L 29/06* (2006.01)

(52) U.S. Cl.
USPC .............................. 713/182; 726/29; 717/175

(58) Field of Classification Search
USPC ........................................................ 713/182
See application file for complete search history.

(56) References Cited

U.S. PATENT DOCUMENTS

| 5,565,857 | A * | 10/1996 | Lee | 340/5.42 |
|---|---|---|---|---|
| 7,103,380 | B1 * | 9/2006 | Ditzik | 455/556.2 |
| 7,143,443 | B2 * | 11/2006 | Song et al. | 726/29 |
| 7,437,680 | B1 * | 10/2008 | Brown | 715/808 |
| 7,746,994 | B1 * | 6/2010 | Sanchez | 379/201.01 |
| 8,233,885 | B2 * | 7/2012 | Kansal et al. | 455/412.1 |
| 2002/0169977 | A1 * | 11/2002 | Chmaytelli | 713/200 |
| 2007/0133555 | A1 * | 6/2007 | Kim | 370/395.3 |
| 2007/0173287 | A1 * | 7/2007 | Henson et al. | 455/557 |

OTHER PUBLICATIONS

Yunxin Liu et al. "xShare: Supporting Impromptu Sharing of Mobile Phones." MobiSys'09, Jun. 22-25, 2009, Krakow, Poland.*
Internet document: "User's Guide for Sanyo PCS Vision Phone VM4500" (at www.sanyo.com/wireless/handsets/downloads/VM4500-UsersGuide-English-121703.pdf; accessed May 16, 2006).

* cited by examiner

*Primary Examiner* — Taghi Arani
*Assistant Examiner* — Narciso Victoria (57) ABSTRACT

An apparatus, system, and method for controlling access to sensitive data in a wireless handset using password protection are disclosed. The wireless handset comprises an input module, a memory module, a display module, and a control module. The input module is configured to manually receive one or more passwords that are input into the wireless handset. The memory module is configured to store at least one password associated with a user-requested function. The user-requested function has a plurality of user-specific data stored on the memory module. The display module displays the stored user-specific data. The control module controls the operation of the input, memory and display modules. The control module controls access to the user-specific data with an initial password received with the input module.

13 Claims, 7 Drawing Sheets

SYSTEM AND METHOD FOR CONTROLLING ACCESS TO A PORTABLE DEVICE

FIELD OF THE INVENTION

This invention relates to an apparatus and method for controlling access to portable device data such as a mobile terminal device. More particularly, the invention relates to enabling different users to share a mobile device in a robust and secure password protected system.

DESCRIPTION OF RELATED ART

In our modern world, security issues have become paramount when it comes to mobile communication systems. People have become increasingly dependent on devices such as telecommunication radio terminals, e.g., cell phones, cellular phones, mobile phones, wireless phones, as these become exponentially more complex and provide more intricate and advance features such as personal organizers, personal digital assistants, personal contact lists, instant messaging features, video conferencing, internet services, personal notebooks, personal calendars, and the like. Consequently, there is a significant amount of sensitive personal information stored in these devices.

Typically, a personal device such as a cell phone is regularly carried around and used only by one person. However, in different situations or places, one cell phone may be used by more than person. For instance, in certain situations, one cell phone may be shared by an entire family or one cell phone may be shared by a group of people. Or cell phones may be simply loaned by family members to other members or friends.

In these situations, safekeeping of a user's sensitive and private data stored in a cell phone from others may pose a special concern. Not uncommonly, it is oftentimes those very persons that the user personally knows from whom the user most desires to safeguard the private and sensitive information and prevent unwanted snooping.

There are a limited number of password protected features associated with cell phones such as initial login passwords to unlock the cell phone, or to unlock the keys. However, little attention has been paid to provide a flexible security system managed by multiple users of a portable device such as a cell phone, which accommodates different needs of people in special communication situations. This is, at present, entirely lacking. Therefore, it would be advantageous to provide a robust mechanism for securely restricting access to personal or sensitive information in such devices shared or handled by multiple users.

SUMMARY

An apparatus, system, and method for controlling access to sensitive data on a wireless handset using password protection is described. The wireless handset comprises an input module, a memory module, a display module, and a control module. The input module is configured to manually receive one or more passwords that are input into the wireless handset. The memory module is configured to store the passwords associated with a user-requested function. The user-requested function comprises a messaging function selected from a messaging group consisting of IM, SMS, MMS, and user contacts data. The user-requested function has a plurality of user-specific data stored on the memory module. The display module displays the stored user-specific data. The control module controls the operation of the input module, the memory module and the display module. The control module controls access to the user-specific data by password protecting the user-specific data with an initial password input with the input module.

The communication system uses password authentication to restrict access to the communication system. The communication system comprises a memory module, a processing unit and a means for accessing a user-requested function and the corresponding user-specific data. The memory module is configured to store at least one user-generated password that is associated with the user-requested function and the plurality of user-specific data. The processing unit is configured to process the entered password associated with the user-requested function. The processing unit is coupled to the memory module and is configured to permit access to the user-specific data when the entered password matches the stored user generated password. There is also a means for accessing the user-requested function and the corresponding user-specific data.

The method of controlling access to a plurality of user-specific data stored on a wireless handset comprises prompting a user to provide at least one user password to access a plurality of user-specific data associated with a user-requested function. The user function is selected from a messaging group consisting of instant messaging (IM) data, short message service (SMS) data, multimedia message service (MMS) data, and user contacts data. The method then proceeds to store the user password in a memory module. Upon receipt and authentication of an entered password, the method permits access to the user-specific data associated with the user-requested function.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems described hereinafter may vary as to configuration and as to details. Additionally, the method may vary as to details, order of the actions, or other variations without departing from the illustrative method disclosed herein.

Figure 1:
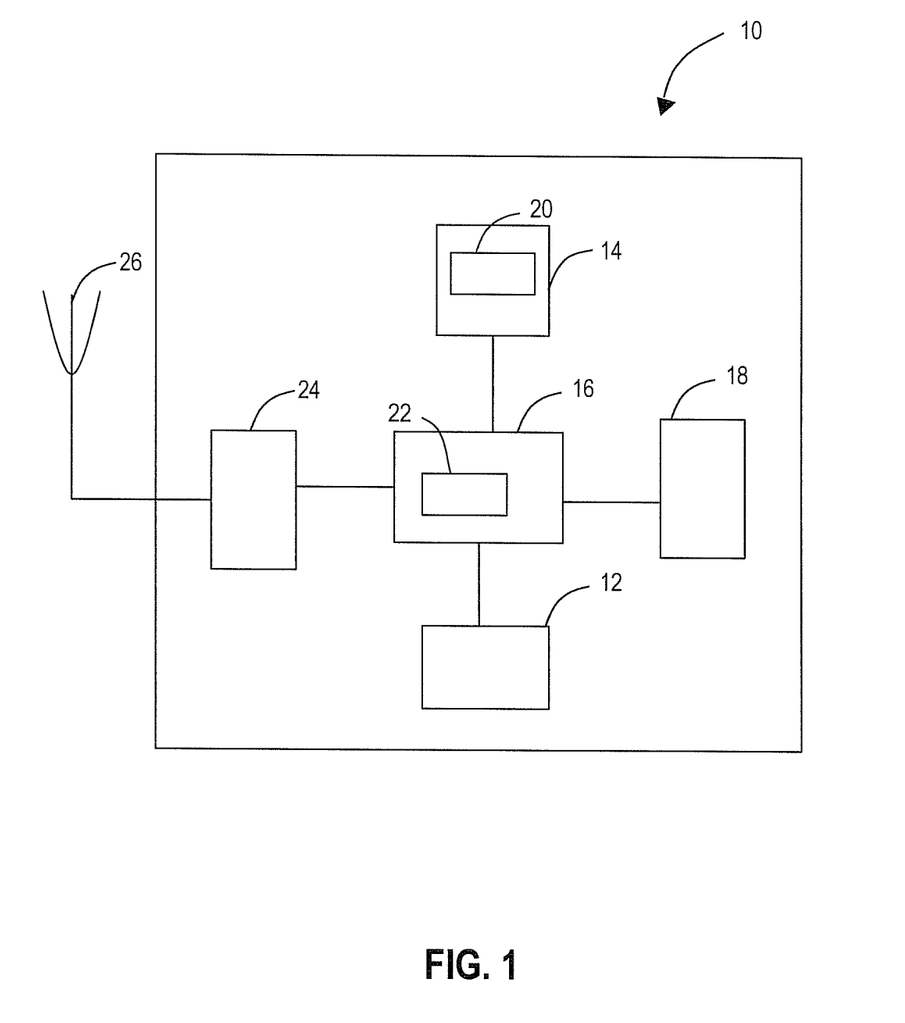
FIG. 1 shows an illustrative diagram of a portable electronic communication device adapted to be operated in a communication system.

Referring to FIG. 1 there is shown an illustrative diagram of a portable electronic communication device 10, which may be a wireless handset, a personal digital assistant (PDA), or any type of personal mobile terminals which are regularly carried by a user having all the elements necessary for operation in a wireless communication system, such as GSM or the UMTS or any other wireless communication system. By way of example and not of limitation, the wireless handset is a portable electronic communication device that is also referred to as a portable device 10. The portable device 10 as shown in FIG. 1 only shows the elements that are related to the description. All other elements necessary for normal operation for the portable device 10 are omitted for the sake of clarity.

The portable device 10 may be built as a light weight and small size device configured to be easily and conveniently carried around by a user on a regular basis. The portable device 10 is configured for user operation and includes an input module 12 enabling a user to manually input data and/or instructions to the portable device 10. The input module 12 includes, for example, a normal key pad, such as key pad for a cell phone or a PDA, and may comprise include specific input keys, such as a scrolling means or the like, to input particular instructions or to perform particular selection functions. Moreover, the portable device 10 includes a memory module 14 for storing input data. The memory module 14 may be used to store other data such as password data received via the input module of the portable device 10.

A control module 16 controls the operation of the portable device 10. In case that the portable device 10 is a cell phone, the control module 16 may be, e.g., a base band processor. The control module 16 includes a processing unit that controls the operation of most other processing elements of the portable device 10, such as the input module 12, the memory module 14, and also a display module 18 for displaying data or information. The control module 16 may also be configured to provide a predetermined time limit for displaying sensitive user-specific data. Furthermore, the control module may be configured to remove the sensitive user-specific data after the predetermined time limit. The control module 14 also permits passwords to be edited and deleted.

According to the present invention, the memory module 14 includes a password section for storing password related data and related data input by the user via the input module 12. It shall be appreciated by those of ordinary skill in the art that a low end cell phone, for example, may support as many as 10 passwords and a higher end cell phone may be able to provide for at many as 30-40 passwords. Thus, a part of the memory module 14 is reserved for a password section 20, in which a user can store a certain number of password data as well as any necessary related data. The maximum number of password data and related data to be stored in the password section 20 also depends essentially on the capacity of the memory module 14. The password data and related data to be stored in the password section 20 may be any kind of data and information related to the use of passwords of any kind and type. The password data itself can hereby include numbers, characters, symbols or the like and/or any combinations thereof.

The plurality of passwords stored in the password section 20 are related to the access to services, user-requested functions, or any other function related to the portable device 10. In one illustrative example, the control module 16 verifies a password and grants access if a verification result is positive. For example, a user-requested function and the associated user-specific data may be associated with a password, so that each time the password is verified, the user is granted access to user-specific data.

The user-requested function comprises a messaging function selected from a messaging group that comprises either instant messaging (IM), short message service (SMS), multimedia message service (MMS), user contacts data, or any combination thereof. The requested function is access with the input module 12 described above, and the associated user-specific data may be access using the display module 18. The user-requested function has a plurality of user-specific data stored on the memory module. The user-specific data is data specific to a particular user, and which the user desires to password protect. A particular password may be associated with a particular set of user specific data, such as particular contact, a particular type of message, or other such parameter that can be used to define a particular set of user specific data. Thus, there may be multiple passwords for accessing, e.g., retrieving, and viewing a SMS text message, a MMS message, or an IM message, for instance.

Additionally, as mentioned above, those skilled in the art shall appreciate that in relation to a portable device 10 such as a cell phone, user-requested functions may include SMS data, IM data, MMS data and any other type of user function provided by a wireless handset that displays on the display module 18 any amount of private or sensitive information regarding the user. For example, a user may desire to keep his SMS messages as well as the identity of the contact person private, but not necessarily delete them before loaning the cell phone to another person.

SMS stands for Short Message Service, which is available on digital networks allowing text messages of up to a hundred or more characters to be sent and received via the network operator's message center to your mobile phone, or from the Internet, using a so-called "SMS gateway" website. If a cell phone is powered off or out of range, messages are not lost. They are still stored in the network and are delivered at the next opportunity. Such short messages may be highly personal in nature as they are text messages sent to a user. Moreover, MMS, which stands for Multimedia Message Service, can be highly personal and sensitive as well since it is a method of transmitting graphics, video clips, sound files, as well as text messages over wireless networks. Similarly, IM (Instant Messaging) data can also be highly sensitive and personal in nature. IM refers to a type of communications service that enables a user to create a kind of private chat room with others in order to communicate in real time over the Internet, analogous to a telephone conversation but using text-based, not voice-based, communication. Typically, the instant messaging system alerts the user anytime another chat buddy on the user's private list is online. Here, the instant messaging function enables a user to initiate a chat session with others using the portable device 10, generating data which may be desired to be kept private.

As can be seen from the above examples, the password database in the password section 20 would enable the use and the storage of password data of any kind for any use related to user-requested functions such as SMS, MMS, IM data. The password data, the related or associated user-requested functions may be selected, input via the input module 12, and optionally edited. Upon inputting and editing data for the password database, the respective information input by the user are displayed on the display module 18 so that the user is able to monitor and manage the password input accurately.

The control module 16 controls the user access to the password database in the memory section 20 and the display of data associated with the user-requested functions (e.g., view messages, or view contacts lists or addresses in a digital phone book) on the display module 18 on the basis of a password inputted by the user initially during a password set up function via the input module 12. Thus, access to specific types of user data (e.g., SMS messages) is only possible and will only be granted by the control module 16 if the user enters the correct password. For the granting of the access to user data on the basis of a previously entered password, several technical solutions are possible. For example, the control module 16 may compare the inputted password to a pre-stored password inputted during the initial password set up function, and grants the user access to the user data provided the checking result is positive. Other known technologies of granting access on the basis of an input password, however, can also be used. Only after inputting the correct password, the content of the requested function is accessible for a user to view the data, to input and enter a new password data or to edit or to delete already stored data related to a requested function. In other words, upon input by the user of a corresponding delete instruction, a function is provided which allows a user to delete the entire password from the memory module 14. In cases where the user has forgotten his or her initial set up password to access the data, the user may also instruct the control module 16 to delete the password database after the user enters a corresponding delete instruction. The user then has the option to create a new password.

Alternatively, as an option, to avoid the unauthorized access by directly reading out the memory module 14, the password database may also be stored in encrypted form. Further, in order to avoid unnecessary exposure of the content of a password protected data or information on the display module 12 after the user has successfully entered its password, a time-out counter in the control module 16 may limit the time during which the content is displayed on the display module. After a certain preset time or pre-selected time period, during which the user has not made any input, the control module 16 may close the password database and remove the displayed data from the display module 12.

Furthermore, in the event that the portable device 10 is adapted to be operated in a wireless communication system, as in the example shown in FIG. 1, the use of passwords may also be necessary to operate the portable device 10 with applications like e-mail, Intranet and the like. If the passwords for these applications are stored in the password database, it is advantageous to provide a corresponding interface 22 in the control module 16, which allows automatically extract the corresponding password from the password database and transfer the password over a wireless communication link. Thus, the user does not need to re-type the password, and the password can be extracted automatically from the password database in order to gain access to the respective data. The user only needs to select which password data and which related data from the password database is needed in the application and the respective data are then transferred over the interface 22 of the control module 22 and via a transceiver 24 and an antenna 26 over the wireless communication link to an allocated receiving terminal (not shown), where the transmitted password data and related data are used to access the user-requested function and respective data the user wants to access.

Additionally, the hardware configuration including the memory module of the portable device 10 may be modified in any manner consistent with patent application US 2005/0213392, having the same assignee as identified herein, and hereby incorporated by reference.

Figure 2:
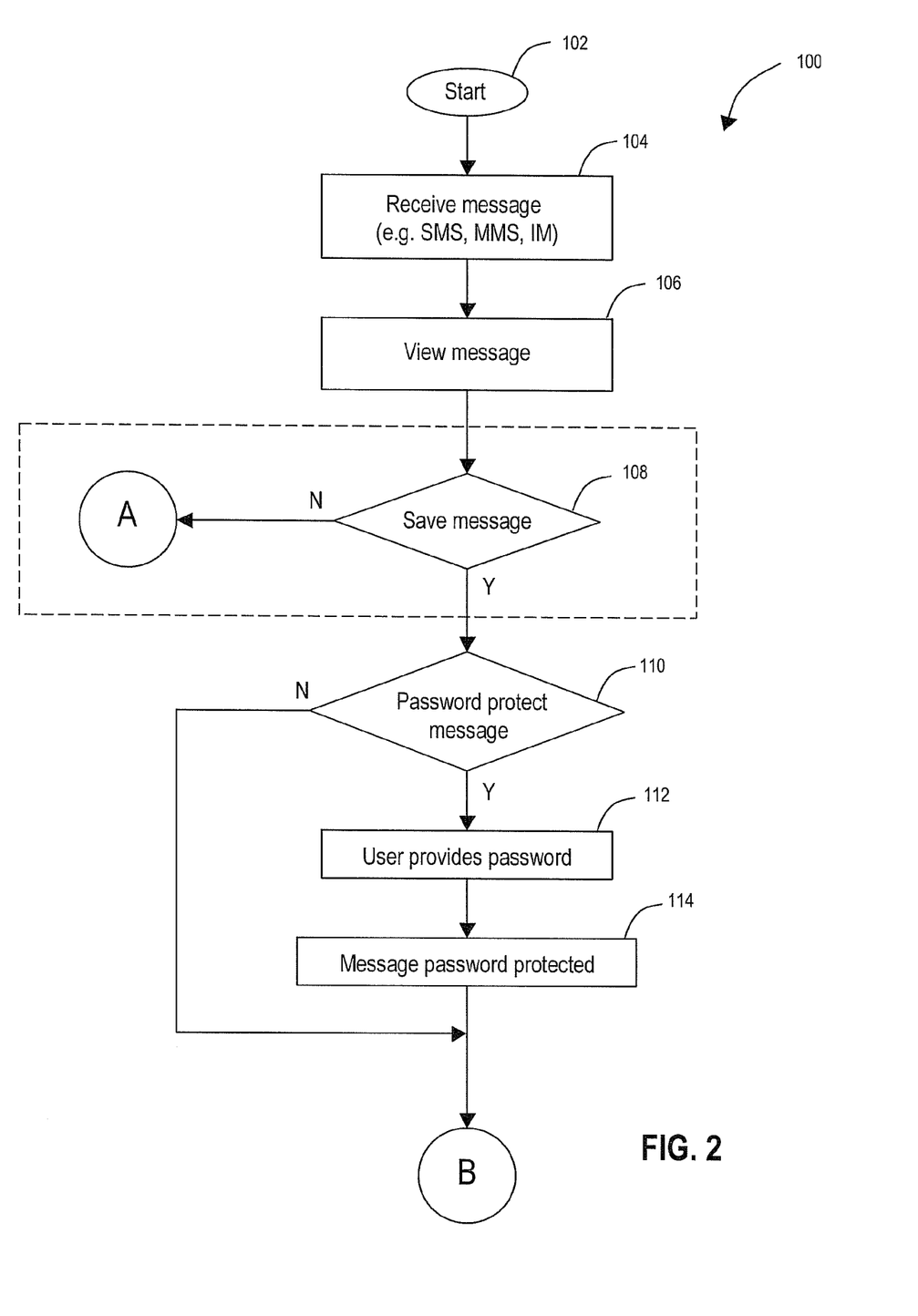
FIG. 2 shows an illustrative flowchart for controlling access to requested functions of the portable device.

Referring now to FIG. 2, there is shown an illustrative flowchart for controlling access to requested functions of the portable device 10. The flowchart 100 may be implemented in the portable device 10 or in any other type of electronic device. By way of example and not of limitation, a portable device 10 is a cell phone for purposes of the present description. But those skilled in the art will note that the present invention may be implemented in any electronic portable communications device.

The illustrative flowchart 100 is initiated at block 102, when a user receives for example, an SMS message in block 104. Those skilled in the art shall appreciate that this step may not be necessary if an SMS or any other type of message or data piece which is desired to be protected has already been received and stored in the memory module of the cell phone, for example. Thus, if the SMS message had been previously received and stored at an earlier instance, then this step may be skipped. However, upon the moment a message has been received, the message may be viewed, usually by pressing an "OK" or "enter" keypad in a portable device such as cell phone, as indicated in block 106. Then, the cell phone may identify a number of options associated with an incoming message, by way of example, such as "reply via SMS", "reply via phone call", "reply via MMS," "save", "delete", "forward", "add to block list", and the like. Such requested functions are standard in most cell phones.

At decision diamond 108, after the user has viewed the message, the cell phone prompts the user as to whether the user desires to "save" the presently viewed message. If the user determines that the message is not worth saving to the cell phone memory, then the illustrative flowchart 100 continues on to circle A, wherein the message is discarded and the illustrative flowchart ends (see FIG. 3, block 122). If the user determines that the message is to be saved to the cell phone memory, then the illustrative flowchart 100 continues on down to decision diamond 110 where the user is prompted to password protect the message. If not, the message is not password protected but it is still properly saved in the cell phone memory and the illustrative flowchart 100 continues on to circle B.

However, if the user desires to protect the message because it may be considered to be sensitive and private in nature, then the user enters a password in block 112 where the user provides a password. The password may be any combination of alphanumeric characters, symbols, and the like. As a result, in block 114, the message is password protected and access is protected by the password. In certain embodiments, the password to protect the message may be globally set or defined, for example, in a setting preference associated with the messaging application. The user is able to set this password through any number of input means when prompted. In particular embodiment, step 112 can be performed once to set the global password, and thereafter be omitted from flow chart 100; the globally set password for messages can be used to protect the particular message determined at decision block 110.

By way of example and not of limitation, the cell phone may prompt the user to input and enter the same password twice in the event that the first time entry was not accurate. This way, if the user has made a mistake on the first entry for some reason, and he is prompted to enter the password again, if the two password entries do not match, the message will not be protected by having a mistaken password stored. The user will be notified that the passwords do not match and prompted again to enter the correct password again both times. This provides added security that a user may inadvertently protect a message using a mistyped or incorrect password.

Figure 3:
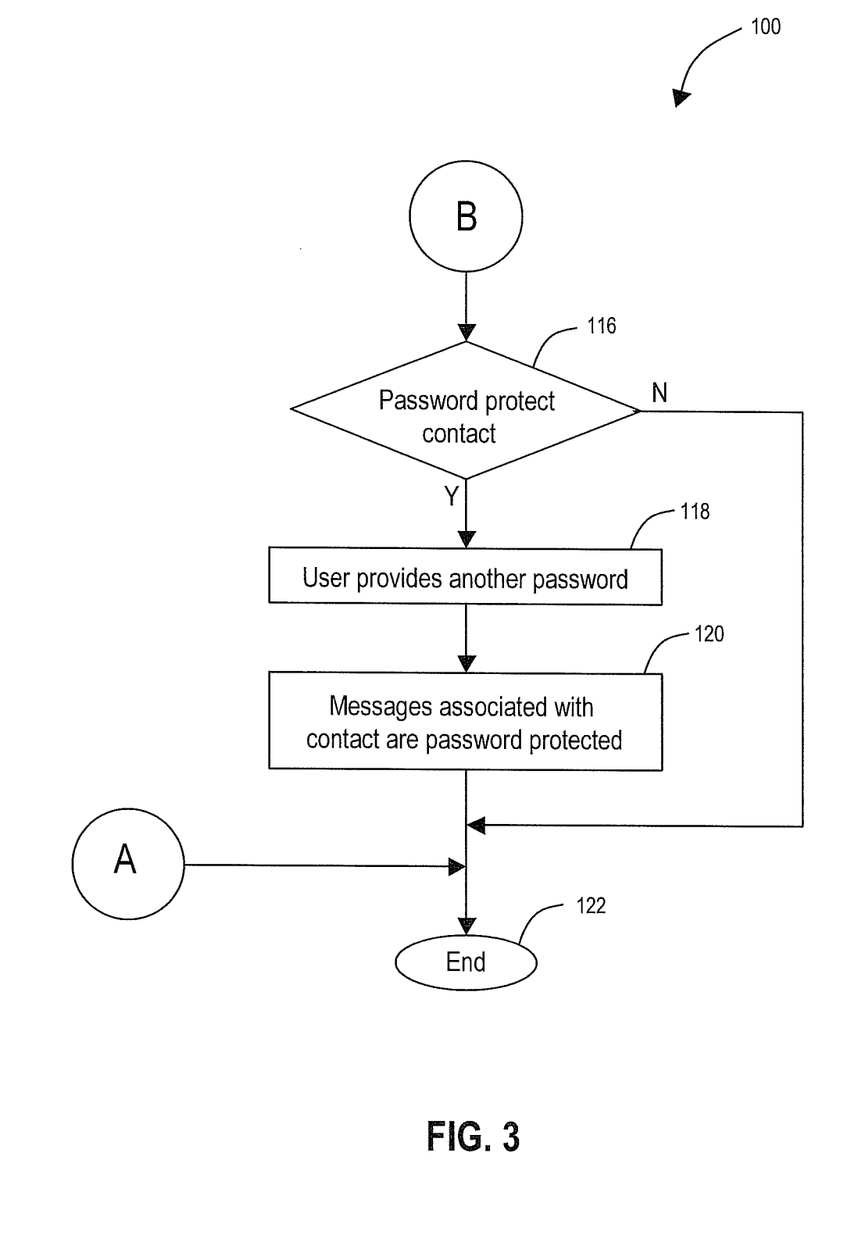
FIG. 3 shows the continuation of the illustrative flowchart for controlling access to requested functions of the portable device of FIG. 2.

Referring to FIG. 3, there is shown a continuation of the illustrative flowchart for controlling access to requested functions of the portable device 10 of FIG. 2. The illustrative flowchart 100 continues from the circle B, which is also shown in FIG. 2. After the user has entered a password to protect the message, the user is prompted as to whether the user desires to also password protect the contact person in block 116, if a contact exists. Those skilled in the art shall also appreciate that an incoming message received or data piece to be safeguarded may not necessarily always have a contact person or contact list associated therewith. If the user desires to protect the message but not necessarily the contact person from which the message is associated with, then the illustrative flowchart 100 continues to end in the oval 122. However, if the user desires to also password protect the contact person's identity, then the user is prompted to enter a password for this function in block 118.

By way of example and not of limitation, those skilled in the art shall appreciate that the user may provide a similar password or a different password to protect the viewing of the contact person's identity. As discussed previously, the cell phone may prompt the user to input and enter the same password twice in case the first time of the password entry was not accurate. This way, if the two password entries do not match, the message will not be protected and the user will be notified that the passwords do not match and prompted again to enter the password again both times. Again, this is an additional precaution which prevents the user from inadvertently protecting a message using a mistyped password. By way of example and not of limitation, if the user chooses to password protect the contact person, then all the messages associated with this particular contact person will be password protected as shown in block 120. After the determination is made that both the message and the contact person are to be password protected, the illustrative flowchart 100 ends in oval 122. In certain embodiments, the password to protect viewing of the contact information or messages from a particular contact may be globally set or defined, for example, in a setting preference associated with the messaging application or the address book application. The user is able to set this password through any number of input means when prompted. In particular embodiment, step 118 can be performed once to set the global password, and thereafter be omitted from flow chart 100; the globally set password for messages can be used to protect the particular contact determined at decision block 116.

Figure 4:
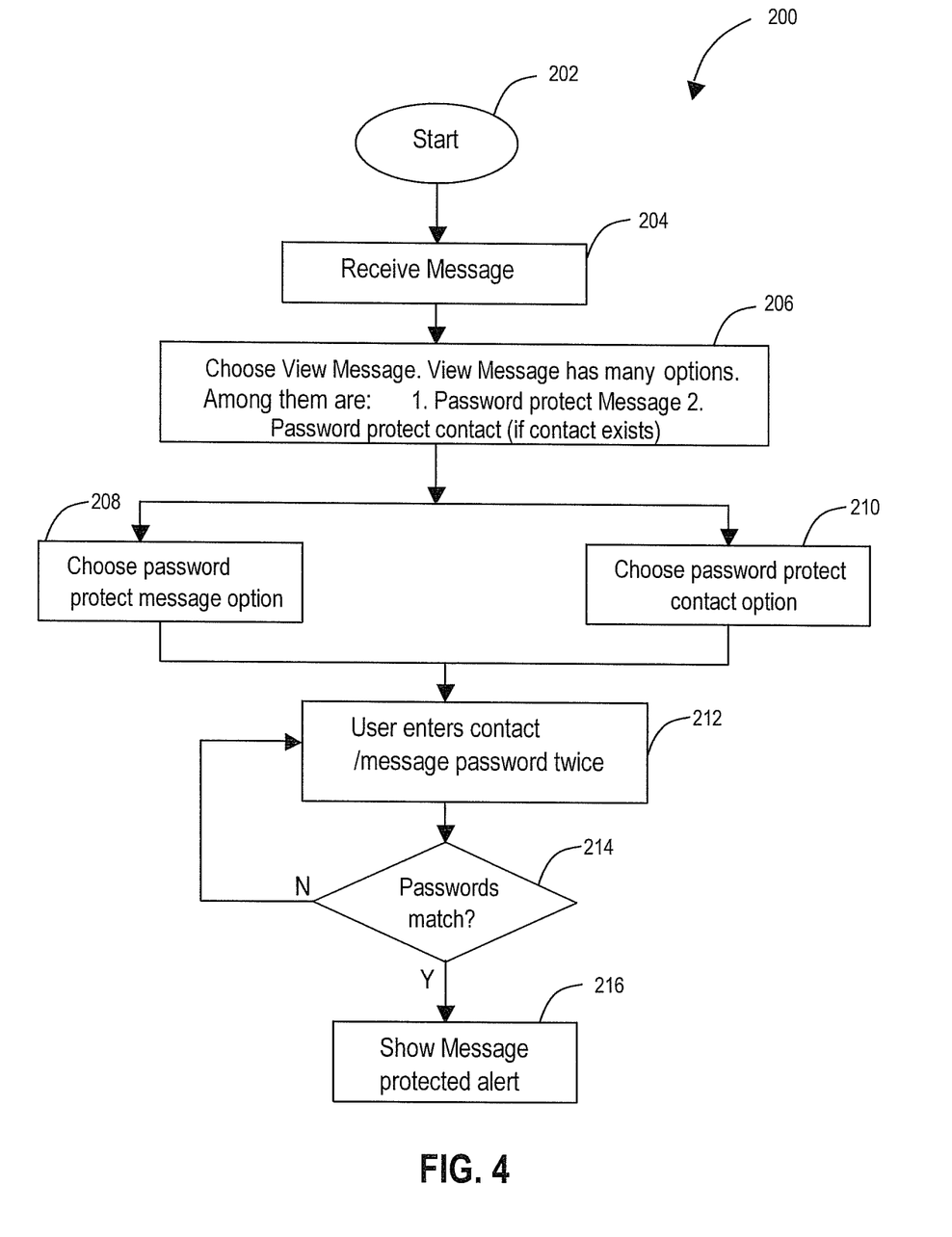
FIG. 4 shows another embodiment of an illustrative flowchart for controlling access to requested functions of the portable device.

Referring to FIG. 4, there is shown another embodiment of an illustrative flowchart for controlling access to requested functions of the portable device 10. The flowchart 200 may also be implemented in a portable device such as portable device 10 of FIG. 1 or in any other type of electronic device. Again, by way of example and not of limitation, a portable device 10 is a cell phone for purposes of this present description.

The illustrative flowchart 200 is initiated at block 202, when a user receives, for example, an SMS message in block 204. Again, those skilled in the art shall appreciate that this step may discarded if a SMS or any other type of message or data piece which is desired to be protected has already been received and is stored in the memory module of the cell phone. Thus, upon the moment a message has been received, the user is prompted to whether or not the message is to be viewed, and this is usually accomplished by pressing an "OK" or "enter" keypad in a cell phone. Then the cell phone may identify a number of options associated with an incoming message, by way of example, such as "reply via SMS", "reply via phone call", "reply via MMS," "save", "delete", "forward", "add to block list", and the like. Such requested functions are standard and available in most cell phones. Furthermore, the user may have the additional security or privacy options, as indicated in block 206. Namely, the user may choose to (1) password protect the message and/or (2) password protect the contact person, if a contact exists.

If the user chooses the "password protect message" option as illustrated in block 208, then the user proceeds to enter the password to protect the message in block 212. By way of example and not of limitation, the user may also choose the "password protect contact" option as well, either before or after executing the "password protect message" option, in block 210. In other words, blocks 208 and 210 may be executed in order, one after another, and they may also be done simultaneously or separately. Next, the user enters the password to protect the message or the contact in block 212. As discussed previously, in block 212, the user may be prompted to input the password twice to prevent the user from inadvertently protecting a message or contact using a mistyped password. If the passwords entered by the user match each other in diamond 214, then a "message protected," "contact protected," or "message and contact protected" alert is shown indicating respectively that the message or the contact person data, or both, are protected, in block 216. As discussed above, in certain embodiments, the password to protect the message and/or the contact may be globally set or defined, for example, in a setting preference associated with the messaging application or address book application.

Figure 5:
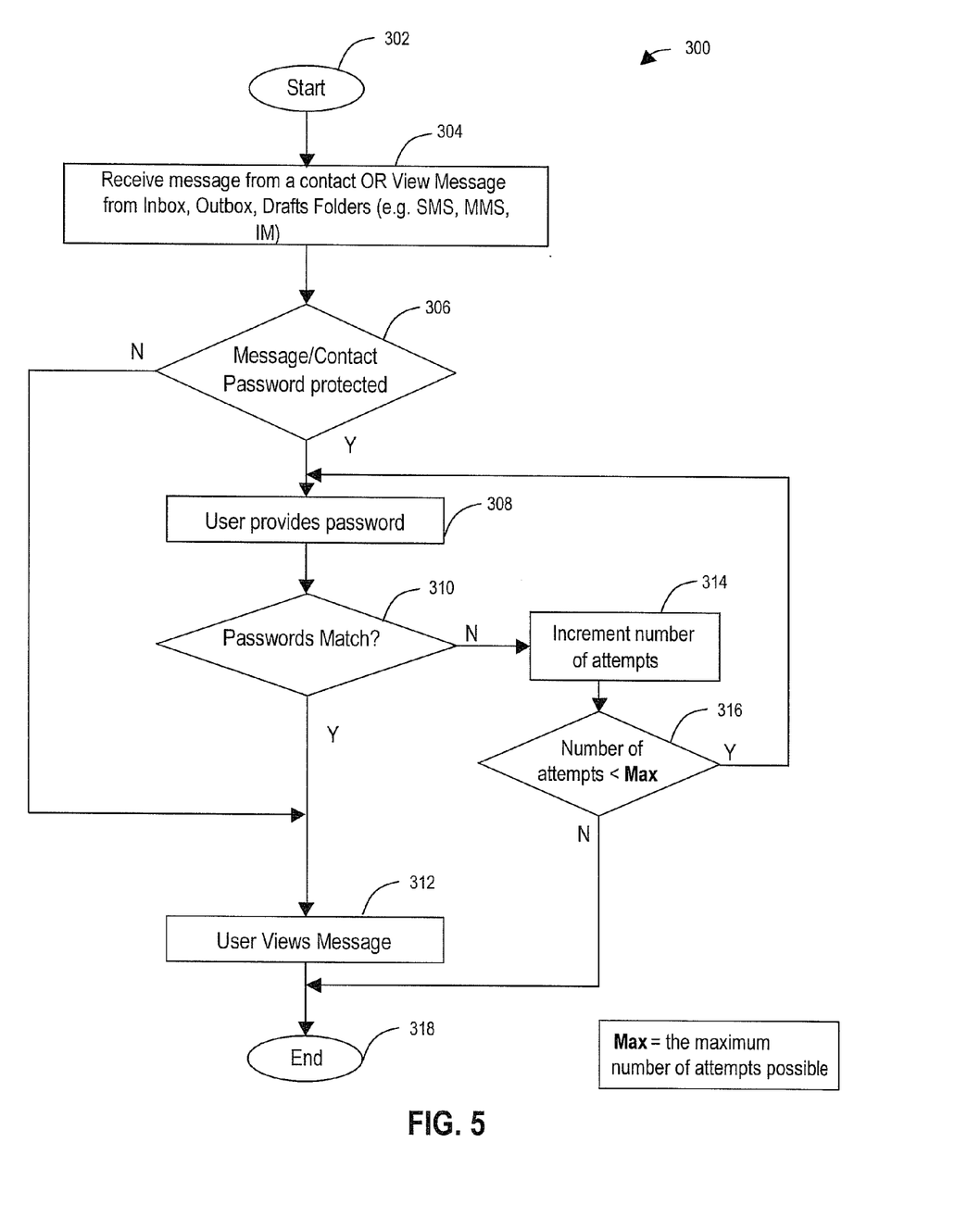
FIG. 5 shows an illustrative flowchart for viewing a password protected function of the portable device.

Referring to FIG. 5, there is shown an illustrative flowchart for viewing a password protected function of the portable device. The flowchart 300 is also implemented in the cell phone. The illustrative flowchart 300 is initiated at block 302, when a user receives, for example, an SMS message, a MMS message, an IM message, and the like, in block 304. Those skilled in the art shall appreciate that this step may not be necessary if an SMS or any other type of message or data piece which is desired to be protected has already been received and is stored in the memory module of the cell phone, e.g., in an "inbox," "outbox", "sent", "draft", "email" folder. Thus, by way of example and not of limitation, a SMS message, for example, may have been received previously and stored at an earlier instance. In this case, the message can be retrieved by the user for re-viewing. Therefore, in block 304, the user may have received a message from a particular contact person or the user may desire to view an older message previously archived in the cell phone memory.

Next, in decision diamond 306, the user may be notified that a particular message or contact person is password protected and in order to permit access, a password must be entered. If a message that has arrived from a particular contact person or is selected for viewing has no passwords associated therewith, then the user simply views the message as indicated in the illustrative flowchart 300, proceeding in particular, to block 312, which proceeds to the end oval 318 of the flowchart 300.

On the other hand, if a contact person or a particular message has been password protected, then the user is prompted to provide the password in block 308. If the password entered by the user matches the password which has been stored in the cell phone memory module during the initial password set up function in decision diamond 310, then the user is allowed to view the user-specific data, e.g. message or any message associated with a particular contact person in block 312. In the event that the password entered by the user does not match the stored password, then in block 314, an additional security feature keeps track of the unsuccessful attempts executed by the user by incrementing the number of unsuccessful attempts. If in the decision diamond 316, the user has attempted a number of unsuccessful entries which exceed a certain maximum number of attempts possible, then the user is not permitted to view the message or any messages associated with that contact person. Consequently, if a user has entered the incorrect password that does not match the password in the cell phone memory, e.g., more than 3 times which is programmed as the maximum number of attempts possible, the user's viewing attempt is terminated, and the flowchart proceeds to the oval 318 in the illustrated flowchart 300.

Figure 6:
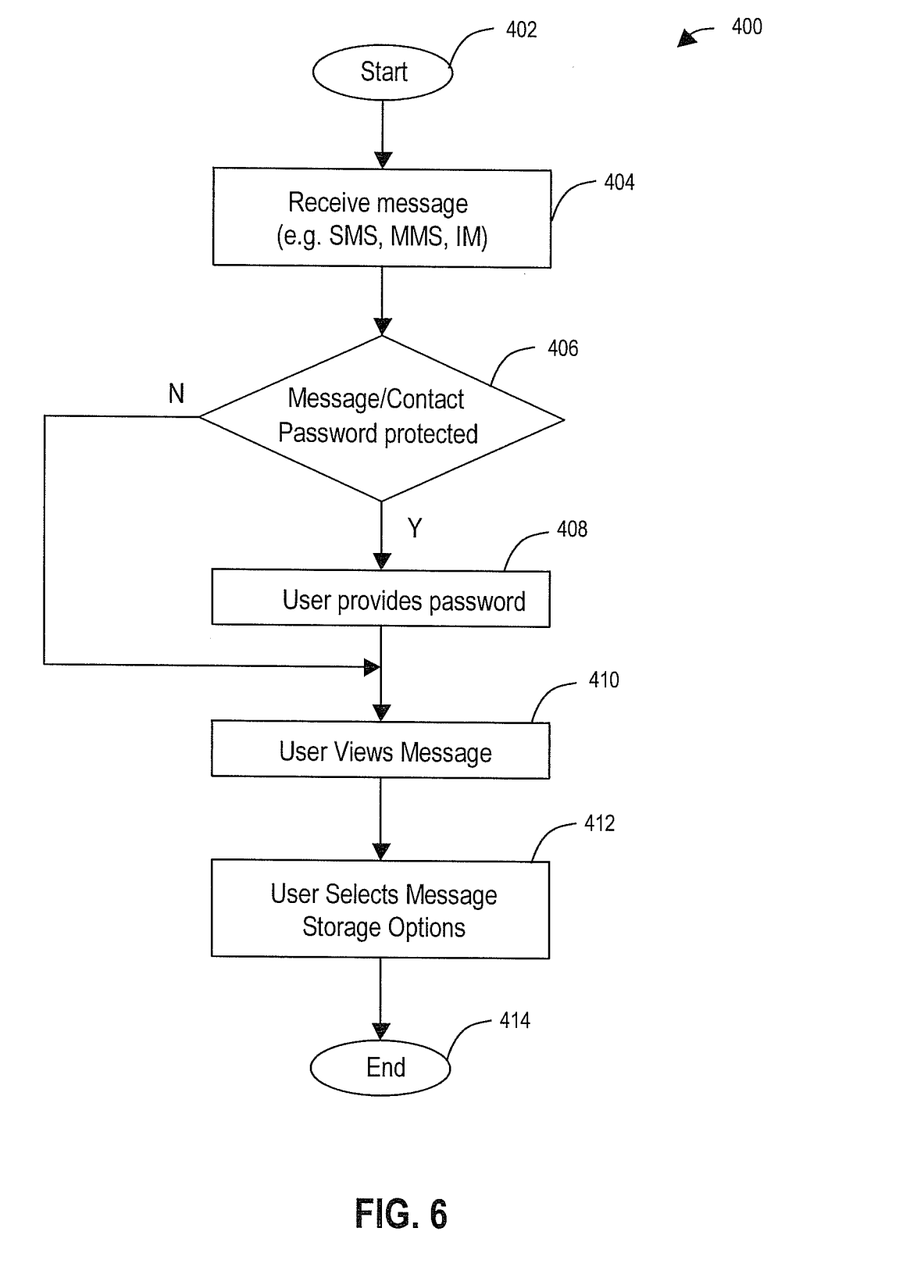
FIG. 6 shows another illustrative flowchart for controlling access to requested functions of the portable device.

Referring now to FIG. 6, there is shown another illustrative flowchart for controlling access to requested functions of the portable electronic communication device. In particular, the illustrative flowchart shows a simplified sequence of user steps. The illustrative flowchart 400 is initiated at block 402, when a user receives, for example, an SMS message, a MMS message, an IM message, and the like, in block 404. Next, in decision diamond 406, the user may be notified that a particular message or contact person is password protected and in order to permit access, a password must be entered. If a message that has arrived from a particular contact person or is selected for viewing has no passwords associated therewith and is thus not password protected, then the user simply views the message as indicated in the illustrative flowchart 400, proceeding to block 410.

On the other hand, if a contact person or a particular message has been password protected, then the user provides the password in block 408. Provided that the password entered by the user matches the password which has been stored in the cell phone memory module during the initial password set up function, the user is allowed to view the message or any message associated with a particular contact person in block 410. After viewing the message, the user may select a number of message saving or storage options in block 412 before ending the process in end oval 414. Those skilled in the art shall appreciate that a loop may be implemented so that after viewing the message, the user may re-edit the user's requested options such as to re-save the message with or without password protection, delete the message altogether, and the like.

Figure 7:
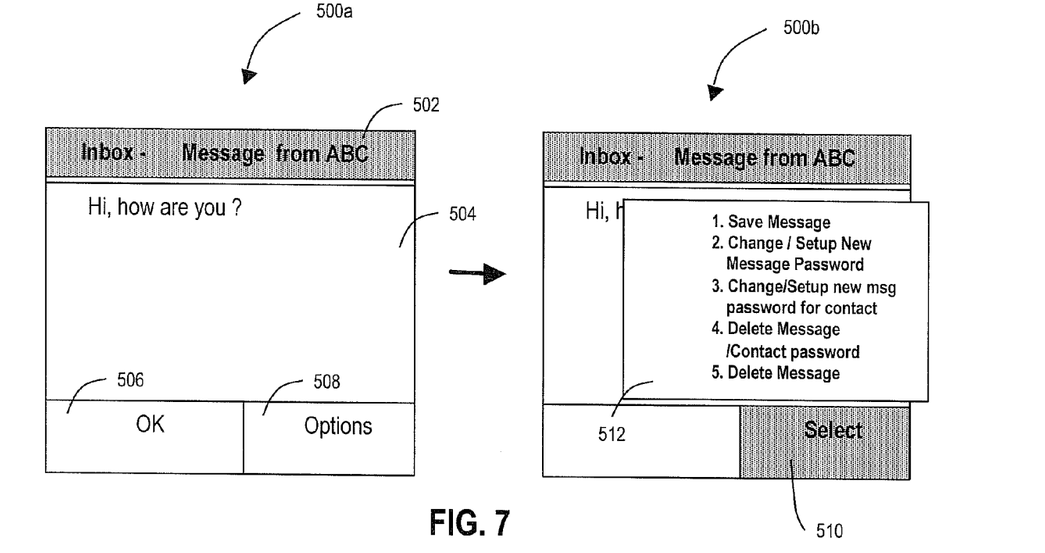
FIG. 7 shows an illustrative diagram of a display of the portable device of FIG. 1.

Referring to FIG. 7, there is shown an illustrative diagram of a display of the portable device of FIG. 1. In a relatively broad illustrative example, in fact, FIG. 7 shows a viewing screen 500a and 500b of a cell phone that a user would observe in actual use. The viewing screen 500a shows an inbox area 502 in particular, indicating that a message from a contact person identified as "ABC" has been received. In the message screen area 504, the text message from "ABC" is shown. Further, an "OK" key 506 and an "OPTIONS key" 508 is illustrated at the bottom section of the viewing screen 500a. This viewing screen 500a effectively represents the cell phone screen that a user would see when the user selects to either immediately view an incoming message or retrieve a message previously stored in memory.

As further illustrated in FIG. 7, in particular, in the viewing screen 500b, the user may elect to execute a number of different functions while viewing the message. For example, while viewing the message or immediately thereafter, the user may press the "OPTIONS" key 508 and select the different functions by scrolling down a select icon provided by the cell phone in the "SELECT" key 510. In other words, in the viewing screen 500b, upon pressing the "OPTIONS" key 508, the key becomes a "SELECT" key 510 which presents the user with a select list 512 where the user has the option to select 5 different functions: (1) save message, (2) change/setup new message password, (3) change/setup new message password for contact, (4) delete message/contact password, or (5) delete message. Those skilled in the art shall appreciate that additional functions may be added.

For instance, the user may set up a new password if none has yet been set up, or change an existing password or to delete the password or delete the message altogether. When the user enters a correct password and is in the process of viewing a message, the option (2) above allows the user to change the password. The user again has to enter a new password twice and if both entries match, the new password is saved. Further, when using the option (4) above, there is the option to delete the password protection. If this option is selected, the message is no longer password protected and the user may access and view the message at anytime.

It shall be appreciated by those of ordinary skill in the art having the benefit of this disclosure, that the illustrative examples and embodiments are intended to describe the different modes of operation of controlling access to user-requested functions. Accordingly, a number of additional features are possible. If a message is password protected and the user chooses to setup a message password for the contact person associated with this message, then the earlier message password may be deleted and only the new contact password will be saved. The reason is because only one password should be ideally associated with one message. Thus, if a contact person has a password protection, then the password for that contact person is used for all the messages and/or data associated with this contact. Since only one password is linked to one message, the option to create a new password for a new incoming message from an existing contact who is already password protected is not present. Furthermore, in order to setup a password for a contact, the contact must already be included in the address contacts or phonebook of the cell phone.

Figure 8:
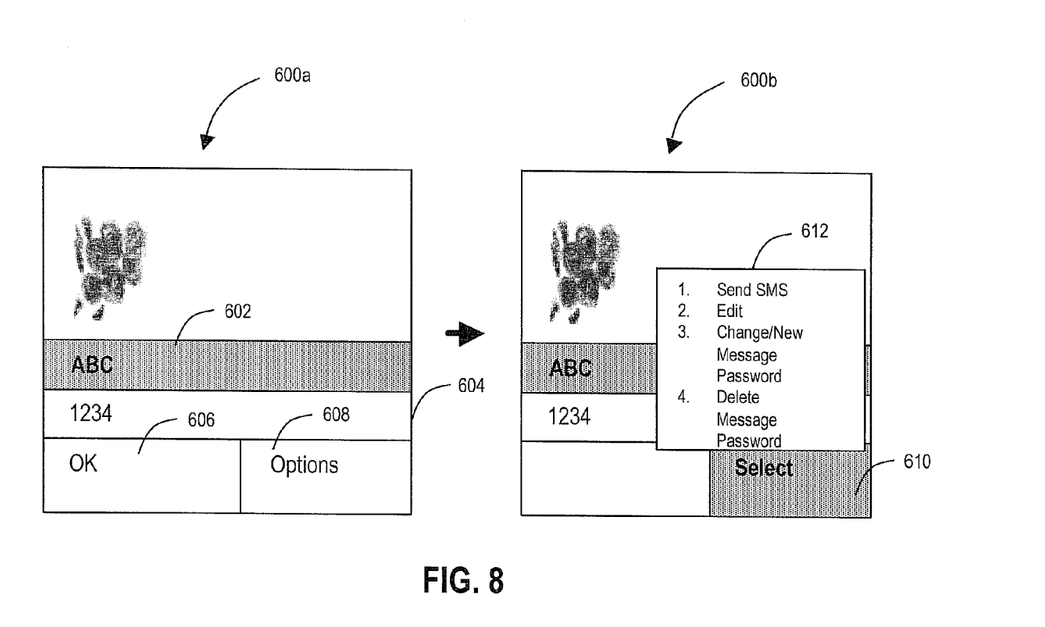
FIG. 8 shows another illustrative diagram of the display of the portable device of FIG. 1.

Referring now to FIG. 8, there is shown another illustrative diagram of a display of the portable device of FIG. 1. By way of example and not of limitation, a message password for a contact may be setup directly from the Address Book or Contacts Section of the cell phone. FIG. 8 shows a contacts screen 600a and 600b of a cell phone that a user would observe in actual use. The contacts screen 600a shows an ID area 602 indicating the identity of the contact person, in this case, "ABC". Another area 604 displays the phone number or contact data of "ABC" as being 1234. Similarly, an "OK" key 606 and an "OPTIONS key" 608 are illustrated at the bottom section of the contacts screen 600a. This contacts screen 600a effectively represents the cell phone screen that a user would see when the user selects to view the contact details of the contact person.

As further illustrated in FIG. 8, in particular, in the contacts screen 600b, the user may elect to execute a number of different functions while viewing contact details of the contact. For example, the user may press the "OPTIONS" key 608 and select the different functions by scrolling down a select icon provided by the cell phone in the "SELECT" key 610. In other words, in the contacts screen 600b, upon pressing the "OPTIONS" key 608, the key becomes a "SELECT" key 610 which presents the user with a select list 612 where the user has the option to select four different functions: (1) send SMS to this contact ABC, (2) edit ABC's contact information, (3) change/setup new message password for this contact ABC, (4) delete message/contact password. Those skilled in the art shall appreciate that additional functions may be added.

For example, to set up a new password, namely, under option (3) above, the user would simply enter a password twice. In order to change an existing password, the user would enter the previous password once for validation and if the validation check is positive, the user enters the new password twice and the new password is now saved. For option (4) above, the user is prompted to enter the current password, and if it matches the password saved in the memory of the cell phone, then the password protection is entirely deleted.

It is to be understood that the foregoing is a detailed description of illustrative embodiments. The scope of the claims is not limited to these specific embodiments or examples. For example, additional password protection may be added so that all message may be protected from unwanted viewing. Then, a second password protection is provided for a particular message and a third password protection may be provided for a particular contact. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A wireless handset comprising:
    an input module configured to receive at least one password that is associated with a user-requested function, in which the user-requested function is selected from a messaging group consisting of instant messaging (IM) data, short message service (SMS) data, and multimedia message service (MMS) data;
    a memory module configured to store, in a password database, the at least one password associated with the user-requested function, the user-requested function having a plurality of user-specific data stored on the memory module, wherein the plurality of user-specific data includes one of an instant messaging (IM) data, a short message service (SMS) data, and a multimedia message service (MMS) data;
    the memory module further configured to store a plurality of passwords that are associated with a set of user-specific data, in which the set of user-specific data includes one of an SMS text message, an MMS message, and an IM message;
    a display module configured to display the stored user-specific data; and
    a control module configured to control the operation of the input module, the memory module and the display module, and to control access to the user-specific data presented on the display by password protecting the user-specific data with the at least one password received via the input module, wherein the control module is further configured to provide a predetermined time limit for displaying the user-specific data and is configured to close the password database and remove the user-specific data from the display module after the predetermined time limit.

2. The wireless handset of claim 1 wherein the control module verifies an initial password and grants the user access to the user-specific data if a verification result is positive.

3. The wireless handset of claim 1 wherein the memory module stores the at least one password in encrypted form.

4. A communication system using a password authentication for restricting access to the system, the system comprising:
    a memory module configured to store, in a password database, at least one user generated password that is associated with a user-requested function, in which the user-requested function is selected from a messaging group consisting of instant messaging (IM) data, short message service (SMS) data, and multimedia message service (MMS) data, and a plurality of user-specific data, wherein the plurality of user-specific data includes one of an instant messaging (IM) data, a short message service (SMS) data, and a multimedia message service (MMS) data;
    the memory module further configured to store a plurality of passwords, wherein each password is associated with a set of user-specific data, in which the set of user-specific data includes one of an SMS text message, an MMS message, and an IM message;
    a display module configured to display the stored user-specific data;
    a processing unit configured to process an entered password associated with the user-requested function, the processing unit coupled to the memory module and configured to permit access to the user-specific data when the entered password matches the stored user generated password, wherein the processing unit is further configured to provide a predetermined time limit for displaying the user-specific data and is configured to close the password database and remove the user-specific data after the predetermined time limit; and
    an input module configured to provide access to the user-requested function and the user-specific data.

5. The communication system of claim 4 wherein the memory module stores the plurality of passwords in encrypted form.

6. The communication system of claim 4 wherein the input module is configured to receive the plurality of passwords.

7. The communication system of claim 4 further comprising a display module configured to display the user-specific data.

8. A method of controlling access to a plurality of user-specific data stored on a wireless handset, the method comprising:
    prompting a user to provide at least one user password to access a plurality of user-specific data, wherein the plurality of user-specific data includes one of an instant messaging (IM) data, a short message service (SMS) data, and a multimedia message service (MMS) data, the user-specific data associated with a user-requested function, the user function selected from a messaging group consisting of instant messaging (IM) data, short message service (SMS) data, multimedia message service (MMS) data, and user contacts data;
    storing each user password in a password database in a memory module;
    storing a plurality of user-specific data passwords in the memory module, wherein each password is associated with a set of user-specific data, in which the set of user-specific data includes one of an SMS text message, an MMS message, and an IM message;
    upon receipt and authentication of an entered password, permitting access to the user-specific data associated with the user-requested function;
    displaying the user-specific data;
    providing a predetermined time limit for displaying the user-specific data; and
    after the predetermined time limit, closing the password database and removing the user-specific data.

9. The method of claim 8 further comprising accessing the user-requested function with an input module configured to receive the plurality of passwords.

10. The method of claim 8 further comprising accessing the user-specific data with a display module configured to display the user-specific data.

11. The method of claim 8 further comprising deleting a first password from the memory module upon input by the user of a corresponding delete instruction.

12. The method of claim 8 further comprising editing a first password from the memory module upon input by the user of a corresponding modify password instruction.

13. The method of claim 8 further comprising selecting a contact list element from a phone book section and directly restricting all access to data associated to the contact list using an options list provided by the phone book section.

\* \* \* \* \*